(12) United States Patent
Poster

(10) Patent No.: US 9,599,212 B2
(45) Date of Patent: Mar. 21, 2017

(54) EMERGENCY SUBSYSTEM FOR A FLUID SYSTEM

(75) Inventor: Scott Poster, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 297 days.

(21) Appl. No.: 13/510,234

(22) PCT Filed: Nov. 16, 2009

(86) PCT No.: PCT/US2009/064510
§ 371 (c)(1),
(2), (4) Date: May 16, 2012

(87) PCT Pub. No.: WO2011/059450
PCT Pub. Date: May 19, 2011

(65) Prior Publication Data
US 2012/0227820 A1    Sep. 13, 2012

(51) Int. Cl.
*F16H 57/04*    (2010.01)
*F01M 5/00*    (2006.01)
*F16N 39/04*    (2006.01)
*B64C 13/42*    (2006.01)
*F01M 1/18*    (2006.01)
(Continued)

(52) U.S. Cl.
CPC ......... *F16H 57/0442* (2013.01); *B05B 1/20* (2013.01); *B64C 13/42* (2013.01); *F01M 1/18* (2013.01); *F01M 5/001* (2013.01); *F01M 11/10* (2013.01); *F16H 57/045* (2013.01); *F16H 57/0416* (2013.01); *F16N 7/40* (2013.01); *F16N 39/04* (2013.01); *B05B 9/002* (2013.01); *B05B 9/0409* (2013.01); *B05B 9/0423* (2013.01); *B05B 15/0406* (2013.01); *F16N 2260/00* (2013.01);
(Continued)

(58) Field of Classification Search
CPC ..... F16H 57/0442; F16H 57/045; F01M 5/00; F01M 5/001; F16N 39/04
USPC ................... 184/6, 6.4, 105.1; 137/602, 605
See application file for complete search history.

(56) References Cited

U.S. PATENT DOCUMENTS 1,608,537 A * 11/1926 Swanberg .............. F01M 5/001
                                                                                         123/142.5 E
1,805,040 A * 5/1931 Groves ................... F02N 19/10
                                                                                         123/169 PB
(Continued)

FOREIGN PATENT DOCUMENTS

DE        19925773 A1    12/2000
EP         0443901 A1     8/1991

OTHER PUBLICATIONS

European Search Report dated Nov. 12, 2013 from counterpart EP Application No. 13182496.3.
(Continued)

*Primary Examiner* — Minh Truong
(74) *Attorney, Agent, or Firm* — James E. Walton

(57) ABSTRACT

A fluid system includes an emergency subsystem and a main subsystem in fluid communication with a working element. The main subsystem is in fluid communication with the emergency subsystem. The system operates in a standard mode and an emergency mode. During standard mode, both the main and emergency subsystems jointly provide fluid to the working element. During emergency mode, the emergency subsystem is configured for independently providing fluid to the working element.

8 Claims, 4 Drawing Sheets

(51) Int. Cl.
  F01M 11/10 (2006.01)
  F16N 7/40 (2006.01)
  B05B 1/20 (2006.01)
  B05B 9/00 (2006.01)
  B05B 9/04 (2006.01)
  B05B 15/04 (2006.01)

(52) U.S. Cl.
  CPC ..... *F16N 2260/50* (2013.01); *Y10T 137/0318* (2015.04); *Y10T 137/8593* (2015.04)

(56) References Cited

U.S. PATENT DOCUMENTS

| | | | |
|---|---|---|---|
| 3,147,821 A | | 9/1964 | Eggenberger |
| 3,953,707 A | * | 4/1976 | Tanis .................. F01M 5/02 |
| | | | 123/142.5 E |
| 4,284,174 A | * | 8/1981 | Salvana et al. ................ 184/6.4 |
| 4,373,421 A | * | 2/1983 | Camboulives ............ F16N 7/32 |
| | | | 184/6.12 |
| 4,717,000 A | * | 1/1988 | Waddington et al. ......... 184/6.1 |
| 4,785,639 A | * | 11/1988 | Biagini .................. F25B 49/02 |
| | | | 62/132 |
| 4,976,335 A | | 12/1990 | Cappellato |
| 5,018,601 A | | 5/1991 | Waddington et al. |
| 5,121,815 A | * | 6/1992 | Francois et al. ............... 184/6.4 |
| 5,434,388 A | * | 7/1995 | Kralik .................. F24H 1/121 |
| | | | 219/522 |
| 6,916,159 B2 | | 7/2005 | Rush et al. |
| 8,651,240 B1 | * | 2/2014 | Motto ............................ 184/7.4 |
| 2005/0126968 A1 | * | 6/2005 | Schmidt ................ B01D 36/02 |
| | | | 210/167.04 |
| 2007/0145069 A1 | * | 6/2007 | Lazzarini .................. F41H 9/06 |
| | | | 222/4 |
| 2007/0261922 A1 | * | 11/2007 | Mullen et al. ............... 184/6.12 |
| 2009/0071753 A1 | * | 3/2009 | Carnelli et al. ................ 184/6.4 |
| 2010/0229823 A1 | | 9/2010 | Gibson et al. |
| 2013/0319798 A1 | * | 12/2013 | Sheridan et al. ............ 184/6.11 |

OTHER PUBLICATIONS

International Search Report and the Written Opinion of the International Searching Authority mailed by ISA/USA, U.S. Patent and Trademark Office on Jan. 22, 2010 for International Patent Application No. PCT/US09/064510, 7 pages.
European Search Report dated Feb. 4, 2013 from counterpart EP Application No. 09851341.9.
European Search Report dated Sep. 13, 2012 from counterpart EP Application No. 09851341.9.
Canadian Office Action dated Jun. 4, 2014 from counterpart CA App. No. 2779603.
Office Action dated Jun. 18, 2014 from counterpart CN App. No. 200980162434.9.
Office Action dated Feb. 11, 2015 from counterpart CN App. No. 200980162434.9.

* cited by examiner

EMERGENCY SUBSYSTEM FOR A FLUID SYSTEM

TECHNICAL FIELD

The present application relates generally to the field of fluid systems and, more particularly, to fluid systems having emergency subsystems.

DESCRIPTION OF THE PRIOR ART

Fluid systems are well known in the art for providing fluid to working elements such as aircraft ailerons, gearboxes, bearings, tractor arms, and other similar devices. There exists a wide variety of fluid systems, including lubrication systems configured for effectively reducing heat and wear created between intermeshing parts. Fluid systems share a common feature, namely, fluid systems typically include a reservoir for storing a fluid, a drive subsystem for providing pressure to the fluid, and a plurality of conduits for channeling the fluid from the reservoir to a working element.

Some fluid systems are subject to extensive wear and exposed to hostile environments. For example, components for a tractor-arm hydraulic system could easily be damaged by the harsh environment associated therewith. In some fluid systems, damage to system's components could lead to catastrophic results. For example, a lubrication system in fluid communication with an aircraft gearbox could malfunction while the aircraft is in flight, resulting in the gearbox seizing and the aircraft becoming inoperable.

Although the foregoing developments represent great strides in the area of fluid systems, many shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

Figure 1:
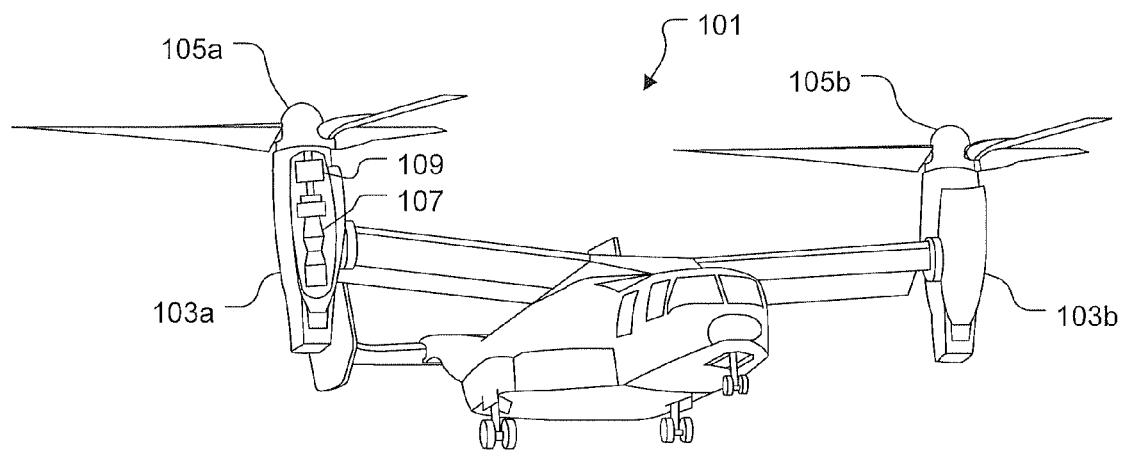
FIG. 1 is an oblique view of a tiltrotor aircraft.

While the process of the present application is susceptible to various modifications and alternative forms, specific embodiments thereof have been shown by way of example in the drawings and are herein described in detail. It should be understood, however, that the description herein of specific embodiments is not intended to limit the invention to the particular process disclosed, but on the contrary, the intention is to cover all modifications, equivalents, and alternatives falling within the spirit and scope of the process of the present application as defined by the appended claims.

DESCRIPTION OF THE PREFERRED EMBODIMENT

The fluid system of the present application overcomes the disadvantages associated with conventional fluid systems. Illustrative embodiments are described below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present application is directed to an emergency subsystem for a fluid system. The fluid system is configured for use with any number of working elements such as components for cars, tractors, trucks, aircraft, and other vehicles or devices. In the preferred use, the fluid system is a lubrication system configured for providing lubricant to various aircraft components such as a rotor gearbox. The present application discloses a fluid system including an emergency subsystem in fluid communication with a main subsystem. Both subsystems include reservoirs coupled to a plurality of conduits for channeling fluid to the working element. The fluid system creates a closed circuit, wherein fluid is circulated through the subsystems and the working element.

The fluid system operates in a standard mode and an emergency mode. During standard mode, both the main and emergency subsystems provide fluid to the working element. During emergency mode, the emergency subsystem independently provides fluid to the working element. The emergency reservoir is configured for carrying a sufficient amount of fluid to allow adequate time for the operator to operate the working element before the working element becomes inoperable. A one-way passage valve is couple to a conduit interconnecting the emergency reservoir to the main reservoir. The one-way passage valve is configured for allowing fluid to pass from the main reservoir to the emergency reservoir during standard mode and prevents fluid from returning back to the main reservoir during emergency mode.

The present application includes a fluid system configured for providing fluid to various types of working elements. For example, the present application could be incorporated with a hydraulic piston for an aileron, tractor arm, or other device that receives fluid. It should be understood that the fluid can be any type of liquid or gas, i.e., a lubricant.

Figure 2:
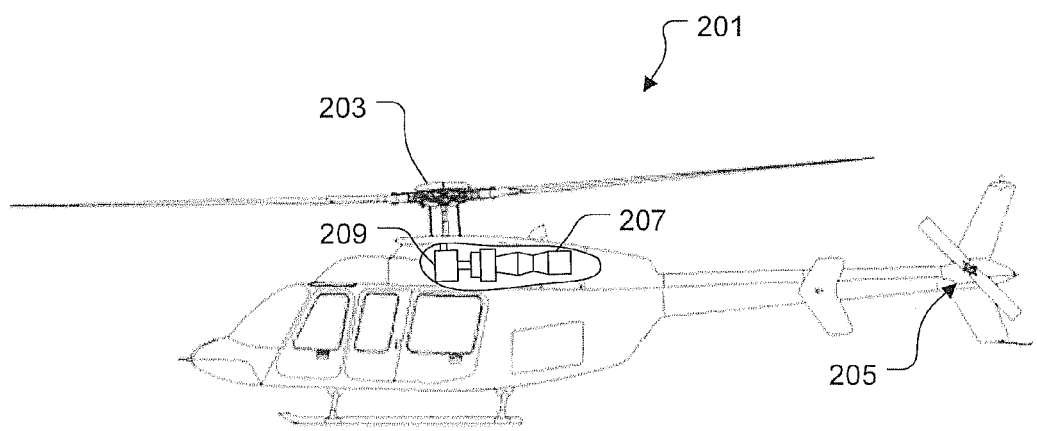
FIG. 2 is a side view of a helicopter.

In one embodiment, the preferred fluid system is configured for use with an aircraft rotor gearbox. In this embodiment the fluid system provides lubricant to intermeshing gears disposed therein. The lubricant reduces friction heat and wear created by the intermeshing gears. FIGS. 1 and 2 illustrate two aircraft having gearboxes in fluid communication with lubrication systems. FIG. 1 illustrates a tiltrotor 101, while FIG. 2 illustrates a helicopter 201. Tiltrotor 101 includes two nacelles 103a and 103b for carrying respective rotor hubs 105a and 105b. A cutout view of nacelle 103a illustrates an aircraft engine 107 coupled to a gearbox 109. In FIG. 2, helicopter 201 is shown with a main rotor 203 and a tail rotor 205. A cutout view of helicopter 201 illustrates an engine 207 coupled to a gearbox 209. Both gearboxes 109 and 209 include a plurality of gears coupled to an input shaft and an output shaft. Gearboxes 109 and 209 are configured for significantly reducing the rotational speed of the engine input shaft. As a result, substantial friction heat and wear are created between the intermeshing gears. The lubrication system provides means for overcoming undesired friction heat and wear created between the intermeshing gears. Without lubricant, the gears will eventually seize and the gearbox will become inoperable.

The fluid system of the present application includes an emergency subsystem configured for providing a reservoir of fluid in the event that the main subsystem fails. For example, the foregoing lubrication system could include an emergency reservoir for providing lubricant to the gearbox in the event that the main subsystem fails. The emergency reservoir could be configured for injecting lubricant at selected areas within gearboxes 109 and 209 such that the gearbox remains operable, thereby allowing the pilot to safely land the aircraft before the gearbox seizes.

Figure 3A:
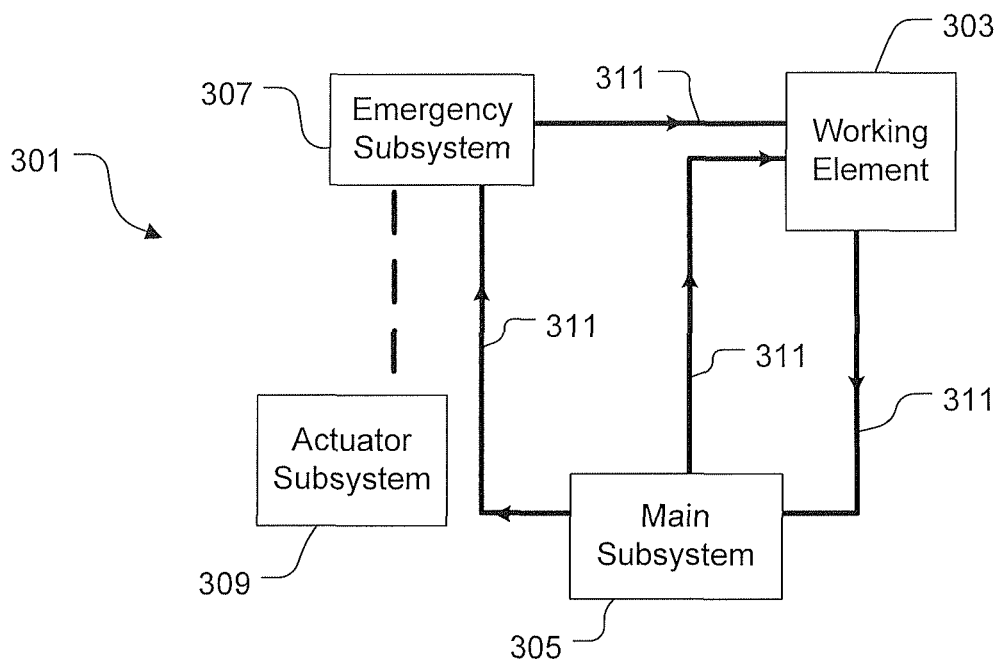
FIG. 3A is a block diagram of a fluid system according to the preferred embodiment of the present application shown operating in standard mode.
Figure 3B:
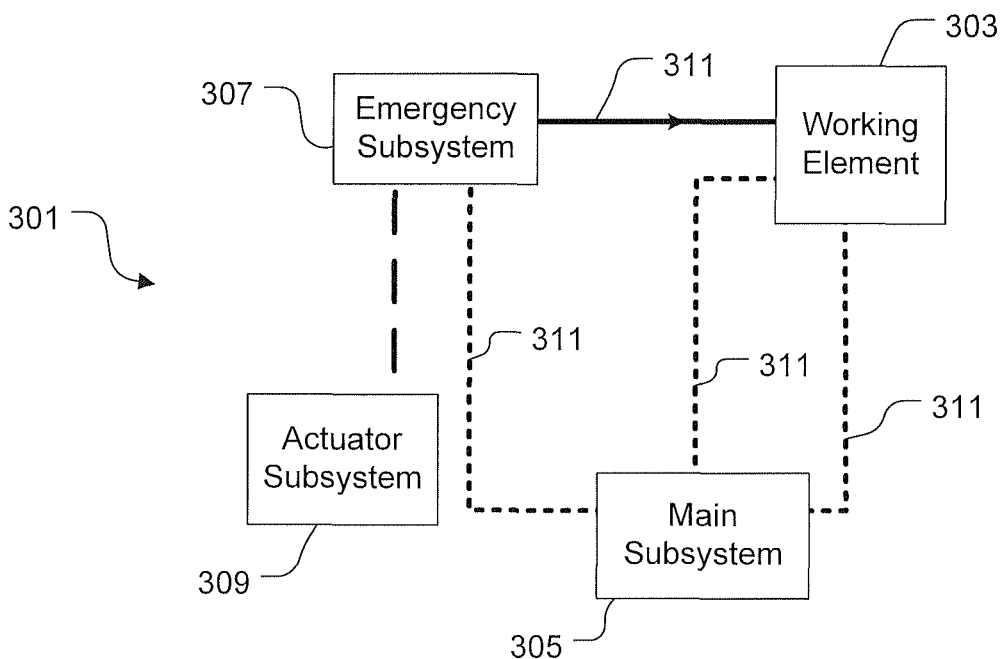
FIG. 3B is a block diagram of the fluid system of FIG. 3A shown operating in emergency mode.

Referring now to FIGS. 3A and 3B in the drawings, block diagrams of fluid system 301 according to the preferred embodiment of the present application are shown in fluid communication with a working element 303. FIG. 3A illustrates fluid system 301 operating in standard mode, while FIG. 3B illustrates fluid system 301 operating in emergency mode. Fluid system 301 can include one or more of a main subsystem 305, an emergency subsystem 307, and a drive subsystem 309. Fluid system 301 includes a plurality of conduits 311 for channeling fluid throughout the system. In the preferred embodiment, conduits 311 are hoses; however, it should be appreciated that alternative embodiments could include different means for channeling the fluid throughout the system. For example, an alternative embodiment could include pipes or other suitable channeling devices.

During standard mode, working element 303 is provided fluid from both main subsystem 305 and emergency subsystem 307. Main subsystem 305 provides fluid to both working element 303 and emergency subsystem 307. It should be understood that fluid is directed through emergency subsystem 307 during standard mode. A drive subsystem 309 is shown operable associated with emergency subsystem 307. During emergency mode, drive subsystem 309 is activated and configured for directing fluid from emergency subsystem 307 to working element 303. As is illustrated in FIG. 3B, emergency subsystem 307 independently provides fluid to working element 303 during emergency mode. It should be understood that the dashed conduit members 313 represent conduit members 311 devoid of fluid.

In the preferred embodiment, fluid system 301 includes one main subsystem 305 and one emergency subsystem 307 in fluid communication with one working element 303. However, it should be appreciated that alternative embodiments could include redundant fluid systems for providing fluid to the working element. Furthermore, alternative embodiments could include two or more emergency or main subsystems for providing fluid to the working element.

Figure 4:
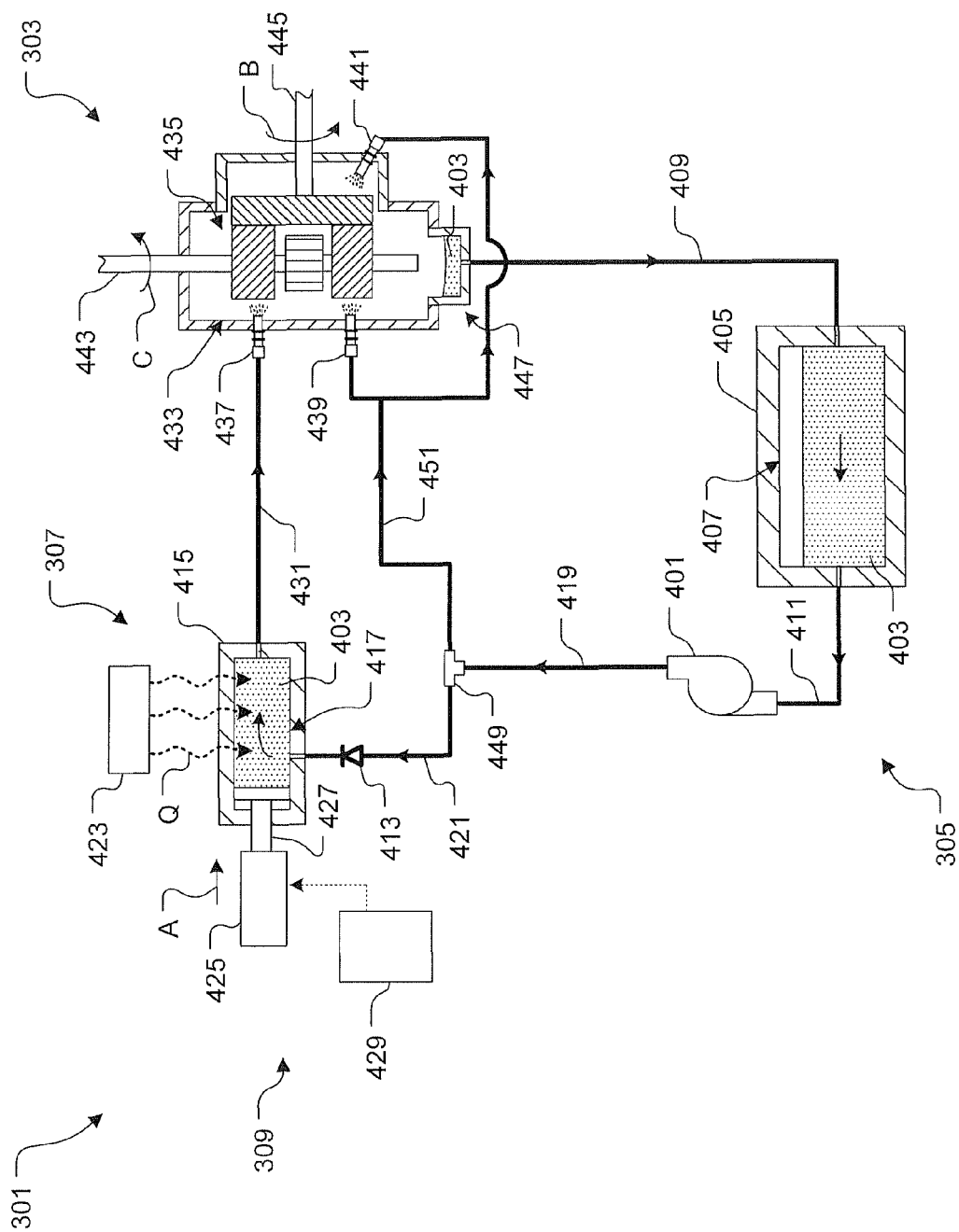
FIG. 4 is a schematic view of the fluid system of FIG. 3A.

Referring now to FIG. 4 in the drawings, a schematic view of fluid system 301 is shown operating in standard mode. FIG. 4 illustrates fluid system 301 in fluid communication with working element 303. In this embodiment, working element 303 is a gearbox; however, it should be understood that in alternative embodiments, working element 303 could include different apparatuses for receiving fluid from fluid system 301. For example, working element 303 could be a fluid piston for an aileron, tractor arm, or other device that receives fluid.

Main subsystem 305 includes a pump 401 configured for providing pressure to fluid 403. As is illustrated, fluid 403 is directed from main subsystem 305 to emergency subsystem 307 and to working element 303. Thereafter, fluid 403 returns to main subsystem 305 to be recirculated through fluid system 301. In the preferred embodiment, main subsystem 305 includes one pump 401 for providing pressure to fluid 403. However, it should be appreciated that alternative embodiments could include a plurality of pumps selectively positioned throughout fluid system 301 for providing additional pressure to fluid 403.

Main subsystem 305 also includes a main reservoir 405 having a main chamber 407 for containing fluid 403. Two conduits members 409 and 411 couple to main chamber 407. As is illustrated, fluid 403 is channeled through conduit 409, passes through main chamber 407, and exits through conduit 411. Thereafter, fluid 403 is channeled to the suction side of pump 401. In the preferred embodiment, main reservoir 405 is positioned separate from working element 303; however, it should be appreciated that alternative embodiments could include a main reservoir disposed within working element 303. For example, an alternative embodiment could use a sump section 447 as the main reservoir, thereby eliminating the need for main reservoir 405.

Emergency subsystem 307 can include one or more of a one-way valve 413 and an emergency reservoir 415. Emergency reservoir 415 includes an emergency chamber 417 for containing fluid 403. As is illustrated, fluid 403 is circulated from main subsystem 305 to emergency subsystem 307 through conduit members 419 and 421. Thereafter, fluid 403 passes through emergency subsystem 307 and is directed to working element 303.

One-way passage valve 413 is configured for allowing fluid 403 to pass from main reservoir 405 to emergency reservoir 415 and prevents fluid 403 from returning back to main reservoir 405 during both standard and emergency modes. In the preferred embodiment, one-way passage valve 413 is a passive valve configured for passively restricting the backflow of fluid 403. However, it should be appreciated that alternative embodiments could include different devices, such as active valves, in lieu of the preferred embodiment. For example, an alternative embodiment could include an active valve controlled by a control subsystem configured for automatically opening and shutting the valve during respective standard and emergency modes.

An optional heater 423 is configured for providing a heat Q to fluid 403. It should be understood that in some applications, fluid 403 has the propensity to freeze at high altitudes or in cold climates. For example, lubricant for an aircraft gearbox could freeze when exposed to cold conditions such as flight at high altitudes or flight in cold climates. Heater 423 overcomes the freezing problems by adding heat to the fluid. As is illustrated, heater 423 provides heat to fluid 403 disposed within emergency reservoir 415; however, it should be appreciated that heater 423 could be configured to heat alternative components of fluid system 301. For example, heater 423 could be coupled to main reservoir 405 or any of the plurality of conduit members. In an alternative embodiment, an electric coil could wrap around the conduit members for providing heat to fluid channeled therein.

Drive subsystem 309 operably associates with emergency subsystem 307 and can include one or more of an actuator 425, a piston 427, and a control station 429. Piston 427 is shown disposed within chamber 417 and coupled to actuator 425. During emergency mode, actuator 425 traverses piston 427 in the direction A, thereby directing fluid 403 through conduit member 431 and into working element 303.

In the preferred embodiment, actuator 425 is configured for receiving fluid from a separate hydraulic system. However, it should be appreciated that alternative embodiments of drive subsystem 309 could include other similarly suitable devices in lieu of the preferred configuration. For example an alternative embodiment could include a gear device, a pre-charged pneumatic, or a pump configured for directing fluid 403 from emergency reservoir 415 to working element 303.

Control station 429 is operably associated with actuator 425 for controlling the traverse speed of piston 427. For example, in one embodiment control station 429 could be configured for providing a sufficient amount of lubricant to an aircraft gearbox for overcoming seizing while reserving a sufficient amount of lubricant such that maximum flight is achieved before the gearbox seizes. It should be appreciated that control station 429 could either be manually operated by an operator or automatically controlled with a computer system.

Fluid system 301 is configured for overcoming problems associated with storing stagnant fluid. For example, over period of time, stagnant lubricant gradually leads to heat degradation. As a result, the stagnant lubricant fails to perform its intended function of efficiently reducing friction heat and wear created between intermeshing parts. As is illustrated, emergency subsystem 307 is located in fluid communication with main subsystem 305. This configuration enables fluid 403 to circulate through emergency reservoir 415 during standard mode. In addition, it should be appreciated that emergency subsystem 307 is readily adaptable to existing fluid systems. For example, emergency subsystem 307 could easily be coupled to conduits 421 and 431 of an already existing fluid system.

Working element 303 can include one or more of an inner chamber 433, a plurality of gears 435, and a plurality of injection jets 437, 439, and 441. An input shaft 443 and an output shaft 445 couple to gears 435 and rotation in respective directions C and B. As is illustrated, fluid 403 is injected at selected areas within working element 303 through injection jets 437, 439, and 441. Thereafter, fluid 403 is accumulated at a sump section 447 positioned within working element 303. Fluid 403 leaves sump section 447 through conduit member 409 and returns to main reservoir 405 for recirculation through fluid system 301.

An optional valve 449 is provided for directing fluid 403 from main subsystem 305 to conduit members 421 and 451. Fluid 403 from main subsystem 305 is channeled through conduit member 451 and directed to injection jets 439 and 441. FIG. 4 illustrates main and emergency subsystems 305 and 307 in fluid communication with injection jets 439, 441 and 437; however, it should be appreciated that any number of injection jets could be used. For example, an alternative embodiment could include a single injection jet configured for fluid communication with both main and emergency subsystems 305 and 307.

In the preferred embodiment, injection jet 437 is configured for injecting lubricant at selected areas where the gearbox has the highest propensity to seize. For example, higher friction heat and wear is created between the planetary gears. Thus, injection jet 437 could be configured for injecting lubricant solely to the planetary gears.

Figures 5, 6:
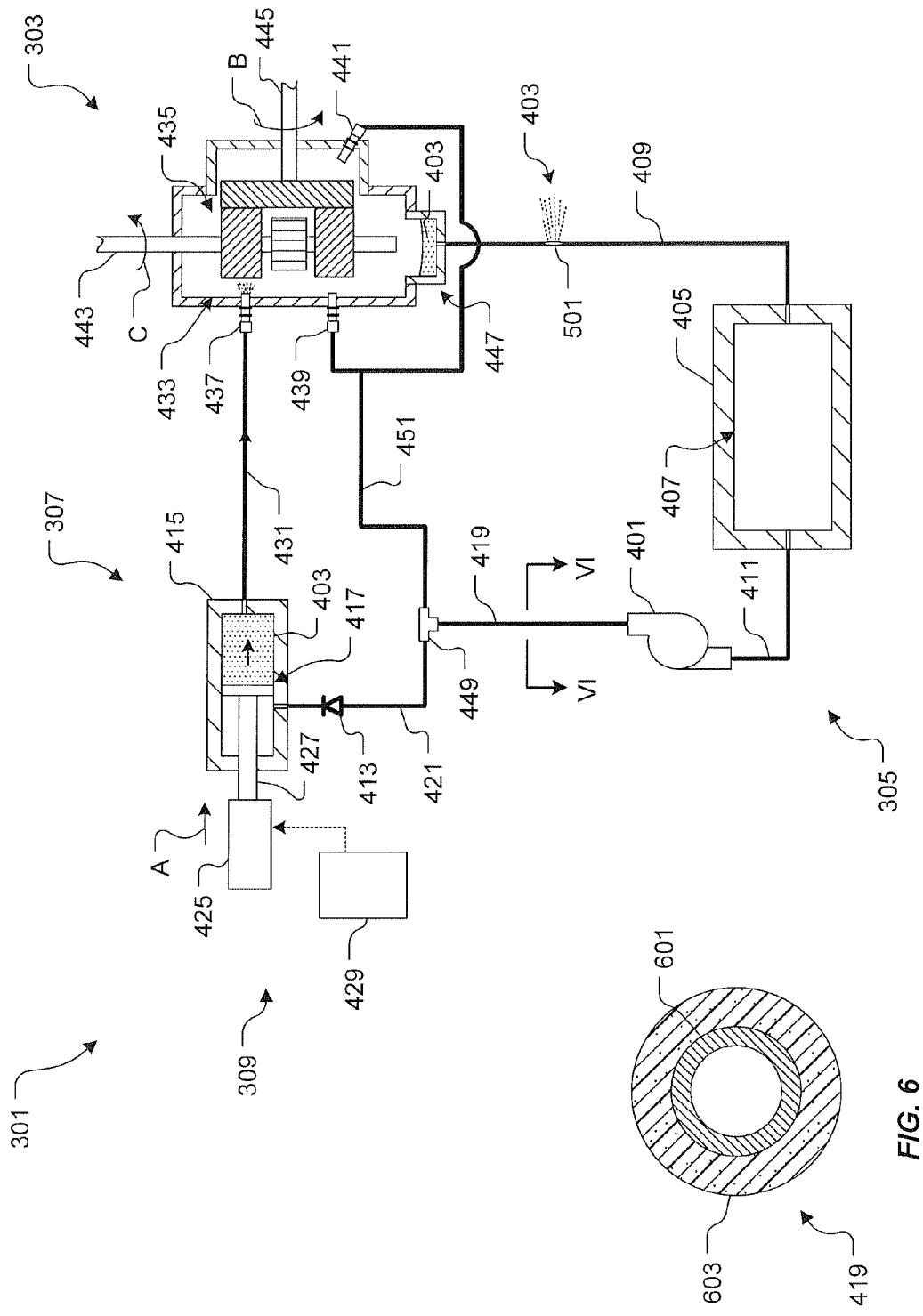
FIG. 5 is a schematic view of the fluid system of FIG. 3B.
FIG. 6 is a cross-sectional view of a conduit of the fluid system of FIG. 5 taken at VI-VI.

Referring now to FIG. 5 in the drawings, a schematic view of fluid system 301 is shown operating in emergency mode. In this mode, an event, such as a hole 501 puncturing through conduit member 409, causes fluid 403 to leak, thereby depleting main reservoir 405 of fluid 403. As a result, main subsystem 305 becomes inoperable and fails to provides fluid 403 to working element 303. During emergency mode, actuator 425 traverses piston 427 in direction A, thereby directing fluid 403 from emergency reservoir 415 to working element 303.

In one embodiment, working element 303 is an aircraft rotor gearbox and fluid 403 is a lubricant. In this embodiment an aircraft engine (not shown) couples to input shaft 443 and rotates a rotor (not shown) coupled to output shaft 445. Input shaft 443 rotates at approximately 15,000 revolutions per minute, while output shaft 445 rotates at approximately 300 revolutions per minute. The large reduction in rotational speed causes a significant amount of friction heat and wear between intermeshing gears 435. For this reason, continuous lubricant is required to overcome seizing.

Emergency reservoir 415 is configured for carrying a sufficient amount of fluid 403 to allow adequate time for operating working element 303 before becoming inoperable. For example, sufficient lubricant is provided to an aircraft rotor gearbox such that the pilot has enough time to land the aircraft before the gearbox seizes. It should be understood that emergency reservoir 415 can be configured to contain various amounts of fluid 403. Some factors determining the size of emergency reservoir 415 include: the desired time required to operate the working element in emergency mode, added weight associated with increasing the size of emergency reservoir 415, and additional costs. For example, in one embodiment emergency reservoir 415 provides enough lubricant to maintain approximately 30 minutes of flight during emergency mode.

Referring now to FIG. 6 in the drawings, a cross-sectional view of conduit 419 is shown taken at VI-VI of FIG. 5. FIG. 6 illustrates conduit 419 having a channel 601 for channeling fluid 403. An optional heating device 603 surrounds channel 601 and is composed of insulation material for retaining heat. However, it should be appreciated that alternative embodiments could include different devices in lieu of heating device 603 for either retaining or adding heat. For example, an alternative embodiment could include electric coils wrapped around channel 601 and configured for adding heat to fluid 403 channeled therein. It should be understood that FIG. 6 illustrates a cross-sectional view of channel 601 and heating device 603 at one location within fluid system 301. However, it should be understood that all conduits within fluid system 301 could include channels and heating devices substantially similar in form and function to channel 601 and heating device 603.

The embodiments of the fluid system shown herein provide many advantages, including: (1) an emergency subsystem configured for providing fluid to a working element in the event that a main subsystem malfunctions; (2) an emergency subsystem configured for adapting to pre-existing fluid systems; (3) a fluid system configured for overcoming problems associated with the fluid freezing during cold conditions; and (4) a fluid system configured for overcoming problems associated with storing stagnant fluid.

It is apparent that a fluid system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present embodiments are shown above, they are not limited to just these embodiments, but are amenable to various changes and modifications without departing from the spirit thereof.

The invention claimed is:

1. A system for providing a fluid to a working element, the system comprising:
    a first injection jet in fluid communication with the working element, the first injection jet being attached directly to the working element;
    a second injection jet in fluid communication with the working element, the second injection jet being attached directly to the working element;
    a main reservoir in fluid communication with the working element via the first and second injection jets;
    an emergency reservoir positioned outside the working element and in fluid communication with the working element via the first injection jet;
    a first conduit in fluid communication with the main reservoir and a pump;
    a second conduit in fluid communication with the pump and the second injection jet attached directly to the working element and configured to inject fluid into the working element;
    a third conduit in fluid communication with the pump and the emergency reservoir; and
    a one-way valve in fluid communication with the third conduit and configured to prevent fluid from flowing from the emergency reservoir to the second injection jet;
    a drive subsystem operably associated with the emergency reservoir;
    a control station operably associated with the drive subsystem;
    a conduit heater configured to heat the fluid while the fluid is located in the second conduit and in the third conduit;
    a reservoir heater configured to heat the fluid while the fluid is in the emergency reservoir;
    wherein the drive subsystem is configured to drive the fluid from the emergency reservoir to the working element;
    wherein the control station is configured to regulate the speed of the drive system;
    wherein the system operates in a standard mode and in the emergency mode; and
    wherein fluid from the main reservoir is injected into the working element through the first and second injection jets when the system operates in the standard mode; and
    wherein fluid from the emergency reservoir is injected into the working element through the first injection jet but not through the second injection jet when the system operates in the emergency mode.

2. The system according to claim 1, wherein the fluid is a lubricant.

3. The system according to claim 1, wherein the working element is an aircraft component.

4. The system according to claim 1, wherein the working element is a gearbox.

5. The system according to claim 1, wherein the drive subsystem comprises:
    an actuator; and
    a piston coupled to the actuator;
    wherein the piston is disposed within the emergency reservoir; and
    wherein the actuator traverses the piston.

6. The system according to claim 1, wherein the speed is increased as more fluid is needed by the working element and decreased when less fluid is needed by the working element.

7. An emergency subsystem configured for providing a fluid to a working element that receives the fluid from a main reservoir via first and second injection jets during a standard mode, the emergency subsystem comprising:
    an emergency reservoir positioned outside the working element and in fluid communication with the working element; and
    a drive subsystem, having:
        an actuator; and
        a piston coupled to the actuator;
        wherein the piston is disposed within the emergency reservoir; and
        wherein the actuator traverses the piston;
    a conduit heater configured to heat the fluid while the fluid is located between the emergency reservoir and the main reservoir; a reservoir heater configured to heat the fluid while the fluid is in the emergency reservoir;
    a one-way valve in fluid communication with the emergency reservoir and the main reservoir, the one-way valve being configured to prevent fluid from flowing from the emergency reservoir to the second injection jet; and
    a control station configured for regulating the traverse movement of the piston;
    wherein the emergency reservoir receives the fluid from the main reservoir;
    wherein the emergency subsystem operates in the standard mode and in an emergency mode;
    wherein fluid from the main reservoir is injected into the working element through the first and second injection jets when the system operates in the standard mode; and
    wherein fluid from the emergency reservoir is injected into the working element through the first injection jet but not through the second injection jet when the system operates in the emergency mode.

8. The emergency subsystem according to claim 7, wherein the fluid is a lubricant.

* * * * *